May 5, 1931.  J. S. THURMAN  1,803,739
GIN
Original Filed Sept. 13, 1923  2 Sheets-Sheet 1
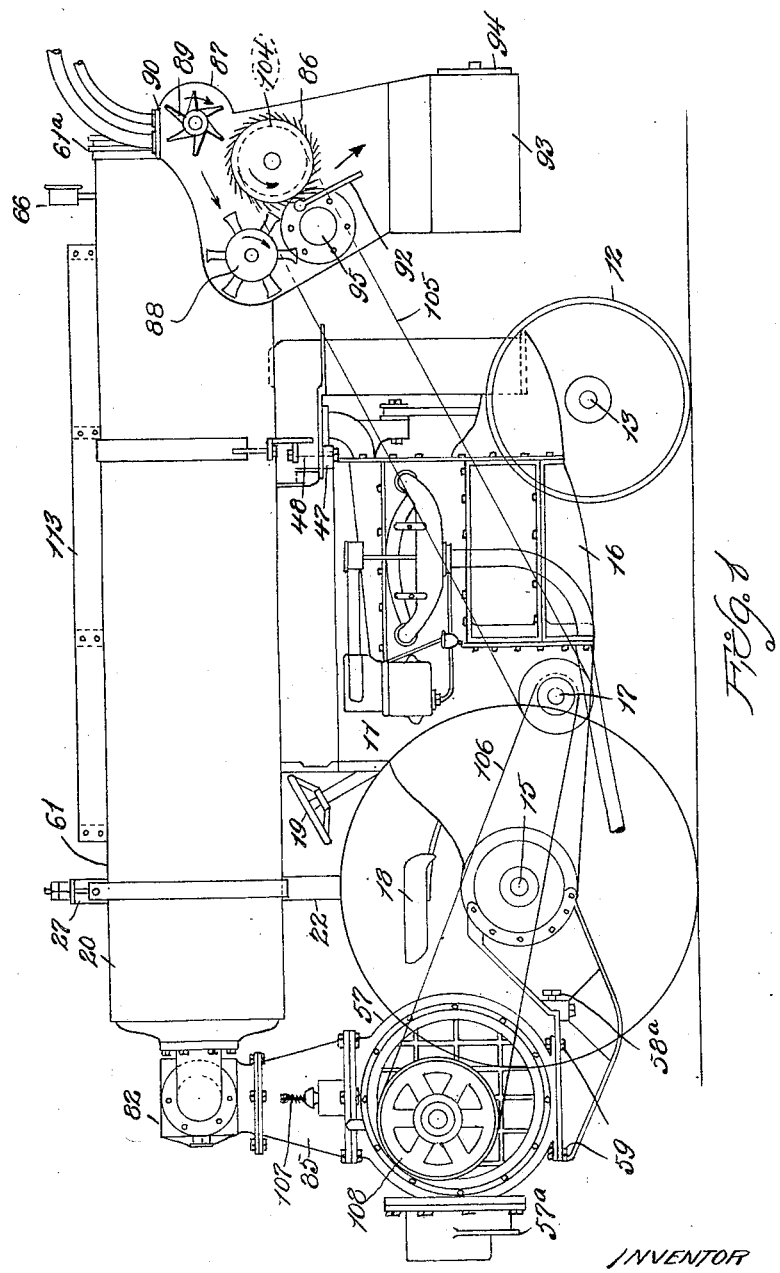
INVENTOR
JOHN S. THURMAN,
by Arthur C Eckert ATTORNEY.

May 5, 1931. J. S. THURMAN 1,803,739
GIN
Original Filed Sept. 13, 1923 2 Sheets-Sheet 2
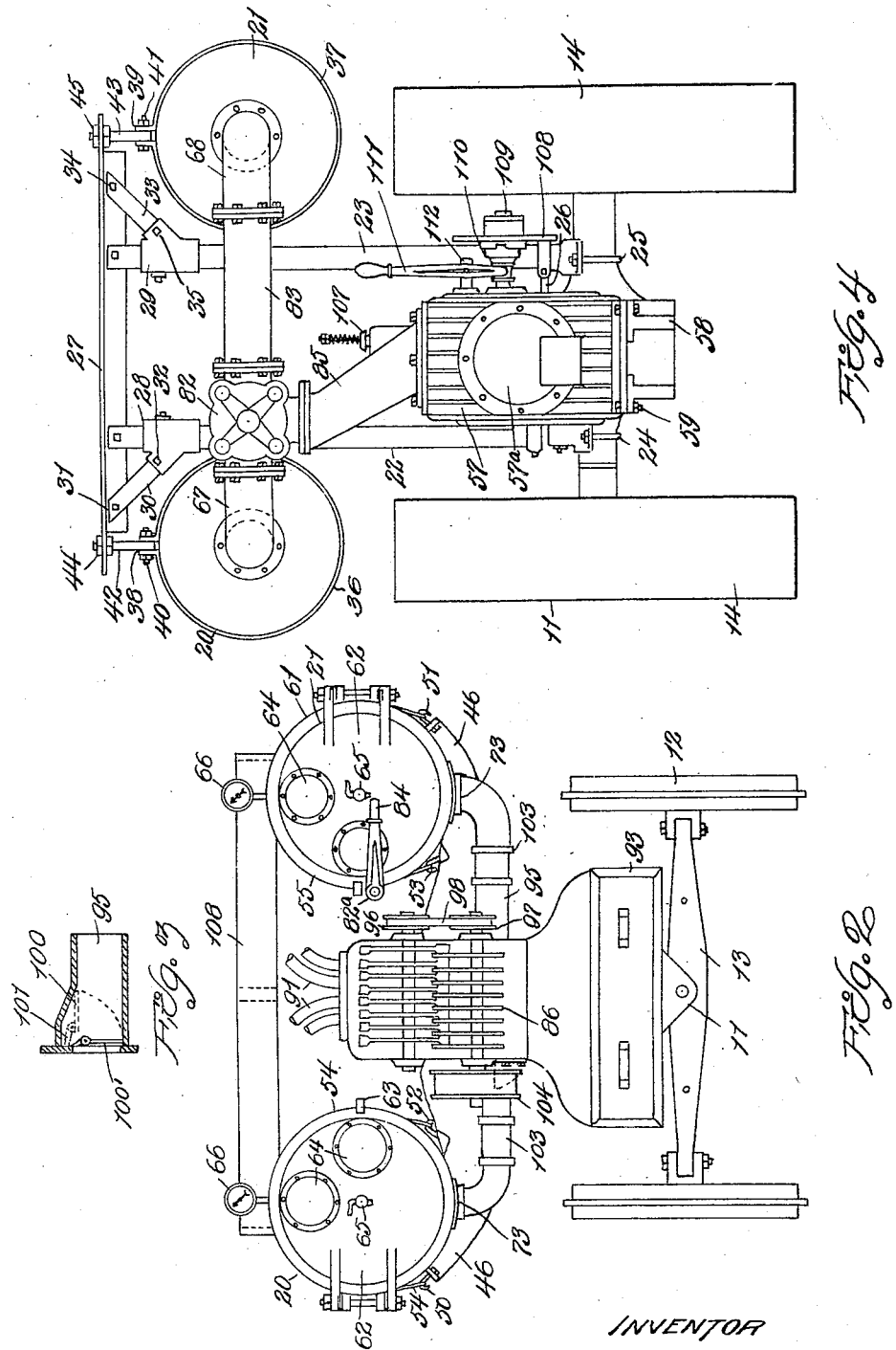
INVENTOR
JOHN S. THURMAN,
by Arthur C. Eckert ATTORNEY.

Patented May 5, 1931

1,803,739

UNITED STATES PATENT OFFICE

JOHN S. THURMAN, OF ST. LOUIS, MISSOURI

GIN

Original application filed September 13, 1923, Serial No. 662,528. Divided and this application filed December 7, 1925. Serial No. 73,958.

This is a divisional application divided out of the application of John S. Thurman, filed Sept. 13, 1923, Serial No. 662,528, for a harvester and gin. This invention relates to combination harvesting and ginning machines. By the use of my machine, the cotton is picked by a mere presentation of nozzles to bolls and ginned in its progress through the machine, the lint being delivered to a bag or bags, and the seed to a proper container. The entire machine is detachably secured to a tractor or other vehicle or engine, so that it may be secured detachably by application or removal of a few bolts, whereby the entire device may be readily moved over the entire field to be harvested and ginned and whereby when the picking and ginning is completed, the vehicle may be free for other work. This invention relates more specifically to a vacuum cotton harvester and gin, the vacuum being produced by a positive acting rotary pump. It requires a vacuum from and at seven inches of the mercury column to pull the lint from the bolls. Applicant is aware that unsuccessful attempts have been made to pick or harvest cotton by means of suction fans to create a suction, using large hose in order to overcome friction, but he is not aware that a fan has yet been invented which has produced an inch of vacuum mercury column. The fan or blower merely puts the air in motion, whereas a rotary pump instantly replaces practically all the air, thereby causing a violent and powerful inrush of air to fill the partial void in the vacuum tanks. As far as applicant is advised, all fan devices resort to mechanical means to tear the cotton from the bolls and the air displacement of the fan is used merely to convey the cotton away. When the openings are closed on a suction fan, or blower, the fan or blower is revolved with greater ease, while with a positive acting suction pump with the openings closed, it will put a greater strain on the motor and will overload the motor to a breaking point, unless safety means are provided to admit atmospheric air to relieve the vacuum. This demonstrates the greater force of the suction pump in its operation and its efficiency when practically used, as compared to a fan.

Among the plurality of objects of my device are included the fabrication of a machine having a plurality of hose and nozzles for picking, a plurality of vacuum tanks, removable, collapsible cotton containers, being detachably secured in the tanks in sliding engagement therewith. Further objects are to supply the vacuum tank intakes with a valve so that the process of picking and ginning may be continuously carried on without interruption, either when a sack of cotton is being removed from the apparatus, or when the cotton is being delivered to either of the tanks separately or altogether. A further object is to interpose a gin between the picking nozzles and the sack containers in the tanks with a suitable removable seed container positioned in the gin. My device offers means for controlling the passage of air to and from the tanks and to provide each of the tanks with a dust screen by which air is thoroughly screened of all dust and trash entering the vacuum pump. An excess vacuum pressure valve that will automatically admit air into the tanks should the vacuum pressure become excessive during the continuous pumping operation in the absence of picking, is provided, as well as automatic flap valves to shut off the vacuum from the tank to be emptied. The bags are provided with a seam in which are formed eyes which may be positioned on hooks formed on a pipe, which in turn is positioned in sliding engagement in a second pipe positioned at the inner top of the container. By this means the bags may be easily inserted and removed. Furthermore, the bags are made sufficiently porous to permit any fine dirt that may be associated with the cotton to sift through to the vacuum tanks from which it may be easily removed. Simple methods for securing the open ends of the bags in the vacuum tanks are provided so that the bags may be quickly attached. Means for deflecting the cotton lengthwise in the sack are also included. The tanks are supported on the vehicle by means of a saddle and columns so as not to occupy the space necessarily needed by the driver of the vehicle and to hold the tanks in a definite spaced relationship and permit lifting by pulleys or other means of the entire device from and above the vehicle, so that the vehicle may be driven out from under the device with its own power.

A further object is to employ a powerful rotary pump that will maintain a high pressure, the pump being so positioned that it may be easily belted to the drive shaft of the tractor, or vehicle. A still further advantage is the positioning of the gin so that the vacuum created in the tanks will pervade the gin and hose and nozzles. Furthermore, the gin is so positioned that it may be easily and directly geared and belted to the drive shaft of the tractor. It will be seen that the tractor furnishes the power for the vacuum pump and the gin.

With these and other objects in view, my invention has relation to certain novel features of construction and arrangement of parts, as will be hereinafter more fully described, pointed out in the claims, and illustrated in the drawings, in which, Fig. 1 is a side elevation of my device with one tank removed, showing the general arrangement of the elements, with the gin shown in section.

Fig. 2 is a front elevation of my device with the front gin cover removed, showing the gin saws and brushes.

Fig. 3 is a sectional elevation of one of the flap valves.

Fig. 4 is a rear elevation of my device.

In the embodiment of the invention illustrated in the drawings, the device is shown as including the conventional tractor 11, having the front wheels 12 secured to the front axle 13 and the rear wheels 14 secured to the rear axle 15 in the usual manner.

Numeral 16 designates the motor having the drive pulley 17, the driver's seat 18 and the steering post and wheel 19. On this vehicle my structure is positioned. In order to support my vacuum tanks 20 and 21, the two columns 22 and 23 are provided, which are firmly secured in an upright position on the rear axle 15 on the differential housing mounted thereon by means of the bolt straps and nuts 24 and 25. The tie rod 26 is secured at one end to the column 22 and at the other end to the column 23. The upper ends of the columns 22 and 23 are bolted to the cross beam 27, as best shown in Fig. 4. Numeral 28 designates a Y fitting positioned on the column 22, in sliding engagement therewith and having a set screw formed thereon for selective positioning on the column. Numeral 29 designates a similar Y fitting positioned on the column 23 in sliding engagement therewith and also having a set screw formed therein for selectively positioning on the column 23. Numeral 30 designates an arm secured to the cross beam 27 at one end by means of the bolt 31 and set in the Y fitting 28 at its other end. Numeral 32 designates a set screw positioned in the arm cup 28 for fastening the Y fitting to the arm cup 28. Numeral 33 designates an arm secured to the cross beam 27 at one end by means of the bolt 34 and set in the Y fitting 29 at its other end. Numeral 35 designates a set screw positioned in the Y fitting 29 for fastening the arm 33 to the Y fitting 29. Straps 36 and 37 encircle the tanks 20 and 21, having their closing ends terminate in projections 38 and 39, in which are formed eyes through which the bolts 40 and 41 pass. Straps 42 and 43 are passed around the bolts 40 and 41 and through holes in the ends of the cross beam 27. By means of nuts 44 and 45, the straps 42 and 43 and hence the straps 36 and 37, and hence the vacuum tanks 20 and 21 are secured to the cross beam 27 and hence to the columns 22 and 23 and hence to the rear axle of the tractor.

By means thus far described the rear ends of the tanks are secured to the tractor. For securing the front ends of the tanks to the tractor, a saddle 46 is employed which rides on the engine frame, as best shown in Figs. 1 and 2. The saddle is secured to the engine by means of the plate 47 and the bolts 48. At the external ends of the saddle 46 are bolted the hooks 50 and 51. Intermediate the ends and the centre of the saddle, the hooks 52 and 53 are bolted. By means of circular bands 54 and 55, having holes drilled therein at their ends, the tanks 20 and 21 are secured near the front ends to the saddle 46. The tanks lie in arcuated grooves in the saddle. The bolts of the hooks 50 and 51 may be manipulated to tighten or loosen the bands 54 and 55. The remainder of my device including the gin and pump is supported from the tanks.

The positive acting rotary pump 57 having an exhaust 57a is additionally supported from the tractor by means of the two brackets 58 which are secured to the pump base by means of the bolts 59 and to the tractor by means of the bolts 58a. The pump is slidably secured in a manner common and well known in the art so that the belt may be tightened. It will be seen therefore that my device is suspended or supported on the tractor at three points and that by the application or removal of a few bolts at each securing point, it may be readily placed in position or removed. The planter may suspend the device from pulleys from any convenient place in the barn when the device is not in use.

When he desires to use the device, he drives the tractor by its own power under the device, lowers it by means of the pulleys into position on to the tractor, fastens the bolts at the points of suspension and he is ready to proceed into the field to pick and gin cotton.

My vacuum tanks of which there may be one, two or more, consist of the shell such as 61, open at the front end and having the flanges with the flat spring door catch 63 attached to hold the door closed. A rubber gasket is inserted in the flanges to seal the door. In the doors are formed glazed openings 64 in order to make the interior of the tanks visible. The cock 65 is also positioned on each of the doors.

If a piece of lint is caught in between the flap 100 (to be subsequently described) and its seat, a partial vacuum in the tank would be maintained when the tank is intended to be closed, thus preventing the free opening of the door. By turning the cock 65, thereby admitting atmospheric air, the vacuum will be overcome and the door may be freely opened. A vacuum pressure gauge such as 66 is placed on the shell 61 in a convenient position. By this means the operator may always know the exact vacuum that is being maintained in the tanks. In the opposite ends of the tanks 20 and 21 are connected the pipes such as 67 and 68, establishing a fluid communication with the vacuum pump 57 by additional means, to be described later. The cotton upon entering the tanks after having passed through the gin (to be described later) is deposited in cloth sacks (not shown) of the length and smaller diameters than the tanks for the air to circulate between. The entry of the cotton to the tanks 20 and 21 is made through removable curved spouts (not shown) which are inserted into the pipe such as 73, through the shell such as 61.

The preferred form of instrumentalities for holding the sacks in the tanks in an open position is the subject matter of a patent application Serial No. 73,957, now patent No. 1,703,503, dated February 26, 1929. The pipes 67 and 68 connect with the three way valve 82 in the rear of the tanks 20 and 21 by means of the pipes and joints 83. The valve 82 is positioned on one side of the centre rather than in the centre in order to make it possible for the driver to have sufficient space to be seated on the seat 18 and control the steering post and wheel 19. A rod 82a connects the valve 82 with the lever 84 in the front of one of the tanks such as 21. The valve 82 is placed in fluid communication with the pump 57 by means of the pipe 85. The valve 82 is a three way valve so designed that the pipe 85 is in fluid communication with either one or both of the pipes 67, 68 at all times. The pump 57 is a specially designed extremely powerful rotary pump. The shaft on the pump 57 is provided with a drive wheel 108 with the clutch attachment revolubly secured on the shaft 109. Engaging with the drive wheel clutch is a slidable clutch 110 actuated by the clutch lever 111 pivoted to the bracket 112. By this arrangement, the pump may be selectively placed in or out of engagement with the remainder of my device. The gin is supported on the tanks in front of the front wheels of the tractor in order to give space for the ingress and egress of the operator to crank the engine. The gin has its saws 86 rotatively mounted in the casing 87 with the gin brush 88 rotatively mounted in proper spaced relationship with the gin saws 86 and with the beater 89 rotatively mounted within the casing in operative spaced relation to the gin saws and the gin brush. Numeral 90 designates the hose plate to which are secured the hose used in picking. All bearings throughout are vacuum tight. I prefer to use six of said hose, which are in fluid communication with nozzles held in the operator's hands and also in fluid communication with the inside of the casing 87. Numeral 92 designates a separator for separating the lint from the seed. Numeral 93 designates a seed container having the drawer 94. The drawer must be positioned in the seed container 93 so as not to prevent admission of air at this point. Numeral 95 designates the flap valve housing connection leading from the gin to the container, such as 20 and 21. The arrows shown on the gin in Fig. 1 indicate the rotational direction of movement of the beater saws and brush. The cotton enters through the hose flap into the casing 87 near its top, where it is beaten or spread by the blades of the beater 89, and then passes over the saws 86 where the seed is torn from the lint and passes on from the gin brush 88 and the gin saw, the brush pulling the lint in the direction of its rotation into the valve housing connection 95, while the seed, owing to the rotational direction of the saw 86, and owing to its greater weight than the lint, drops on to the separator 92 to the right in Fig. 1, into the seed container 93. The shafts on which the gin saw 86 and the gin brush 88 are mounted are journaled in the casing 87 and they extend to one side thereof, beneath each other. Pulleys 96 and 97 are keyed to each one of these shafts and the pulleys are connected by the belt 98. A valve 100 is placed in the pipe connecting the gin to the flap valve housing connection. This valve is of the flap valve type and consists of a valve plate 100 hinged to the link 101, which in turn is secured to the frame at 102. There are two such valves. The pipe is enlarged to permit the valve plate and links, just described, to be positioned in the enlargement when the valve is open and thereby not restrict the cross sectional area of the pipe at this point. The links are resorted to in order to positively close the valve when desired. In order to effect this result, it is necessary that the valve plate 100 lay flat against its seat. This could not be accomplished without the links, such as 101. It will be seen that when the vacuum is maintained in either one of the vacuum tanks by means of the three way valve, that fact will cause the companion valve to remain open. It is likewise obvious that when the vacuum is destroyed by the three way valve that the valve will be closed gravitationally.

In order to take care of the alinement strain in the pipes connecting the gin with the tanks, and in order to provide for small relative movement, a rubber connecting hose 103 secured by metal bands is placed in the line between the gin and the tanks. To the shaft of the gin saws on the end opposite that to which is secured the pulley 97, is keyed the larger pulley 104. By means of the belt 105, the pulley 104 is connected to the drive pulley 17 of the tractor. By means of the belt 106, the drive pulley of the pump 57 is connected to the drive pulley 17.

The path of the cotton from the boll through the operator's nozzles is as follows: It passes from the hose 91, which may all be operating at one time, into the vacuum tight casing 87, wherein it is ginned, the seed falling into the seed container 93, into the drawer 94, where it may be easily removed.

Numeral 113 designates a rack secured on the top of the tanks for carrying hose, nozzles, etc.

What I claim and mean to secure by Letters Patent is:

1. In a device of the class described, the combination of a tractor, a plurality of longitudinally disposed suction tanks supported thereby thereabove, a gin supported by said tanks adjacent to one end of said tractor and communicating with one end of each tank, and a vacuum pump carried by the other end of said tractor and connected to said tanks at points remote from the points of connection of the latter with said gin, thereby producing suction in said tanks and said gin and causing the cotton discharged into said gin to be passed therethrough and delivered into said suction tanks.

2. A ginning machine comprising in combination a tractor, a suction tank carried thereby, a vacuum pump carried by said tractor and having communication with said tank for producing vacuum therein, and a gin supported by said tank in spaced relation with said tractor and communicating with said tank whereby said gin is placed under suction and the cotton lint is drawn into said tank from said gin.

3. In a device of the class described, the combination of a tractor having power take-off members, a suction tank carried by said tractor longitudinally thereof, a vacuum pump operatively connected to one of said take-off members and communicating with said tank to produce vacuum therein, a cotton gin supported by the forward end of said tank in spaced relation with the forward end of said tractor and operated by the other one of said power take-off members for ginning the cotton delivered thereinto, and a conduit leading from said cotton gin to the corresponding end of said tank whereby suction is produced in said gin and the cotton fiber separated from the seed is drawn by suction into said tank.

4. In a device of the class described, the combination of a power driven wheeled support including power take-off means, a plurality of suction tanks carried by said support and disposed longitudinally thereof thereabove, a vacuum pump carried by the rear end of said support and communicating with the corresponding ends of said tanks for producing suction therein, means operatively connecting said vacuum pump with said power take-off means, a cotton gin supported by the forward ends of said tanks in spaced relation with the forward end of said support and having communication with said tanks whereby said gin is placed under suction, means operatively connecting said gin with said power take-off means, and a plurality of flexible hose connections leading from said gin and opening to the atmosphere whereby cotton is delivered by suction through said hose connections into said gin where the seed is separated and the cotton fibers are delivered from said gin by suction into said suction tanks.

5. In a device of the class described, the combination with a horizontally disposed suction tank and means connected to one end thereof for producing vacuum therein, of a cotton gin supported by the other end of said tank, a conduit leading from said gin to said suction tanks, means for actuating said cotton gin, and means for delivering cotton into said gin for ginning operations whereby the cotton fibers are discharged from said gin by suction into said suction tank, said tank and said gin and the connections therefor being hermetically sealed so as to maintain proper vacuum therein.

In testimony whereof I affix my signature.

JOHN S. THURMAN.